(12) United States Patent
Ottersbach et al.

(10) Patent No.: US 11,098,796 B2
(45) Date of Patent: Aug. 24, 2021

(54) HARMONIC DRIVE

(71) Applicant: Schaeffler Technologies AG & Co. KG, Herzogenaurach (DE)

(72) Inventors: Rainer Ottersbach, Aurachtal (DE); Peter Zierer, Erlangen (DE); Tobias Preuß, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 409 days.

(21) Appl. No.: 16/081,149

(22) PCT Filed: Feb. 17, 2017

(86) PCT No.: PCT/DE2017/100131
§ 371 (c)(1),
(2) Date: Aug. 30, 2018

(87) PCT Pub. No.: WO2017/152903
PCT Pub. Date: Sep. 14, 2017

(65) Prior Publication Data
US 2019/0072172 A1 Mar. 7, 2019

(30) Foreign Application Priority Data
Mar. 11, 2016 (DE) .......... 102016204017.0

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01); *F16H 2049/003* (2013.01)

(58) Field of Classification Search
CPC ............ F16H 49/001; F16H 2049/003; F16H 2049/006; F01L 2001/3521
See application file for complete search history.

(56) References Cited

U.S. PATENT DOCUMENTS

| | | | |
|---|---|---|---|
| 9,989,113 B2 * | 6/2018 | Son | F16D 65/18 |
| 2003/0121363 A1 * | 7/2003 | Poehlau | H02K 7/06 |
| | | | 74/640 |
| 2007/0101820 A1 * | 5/2007 | Bulatowicz | F16H 49/001 |
| | | | 74/640 |
| 2009/0205451 A1 * | 8/2009 | Bayer | F16H 49/001 |
| | | | 74/325 |
| 2012/0046140 A1 * | 2/2012 | Shelef | F16H 49/001 |
| | | | 475/182 |

(Continued)

FOREIGN PATENT DOCUMENTS

| | | |
|---|---|---|
| CN | 104864066 A | 8/2015 |
| CN | 204739189 U | 11/2015 |
| DE | 10122660 A1 | 11/2002 |

(Continued)

*Primary Examiner* — Joseph Brown

(57) ABSTRACT

A harmonic drive is provided that comprises a wave generator, a flexible, externally toothed gear element that can be deformed by said wave generator, and at least one internally toothed gear component which meshes with the flexible, externally toothed gear element. The externally toothed element has, with respect to its mechanically unloaded state, a non-circular shape that deviates from an elliptical shape.

11 Claims, 2 Drawing Sheets

(56) References Cited

U.S. PATENT DOCUMENTS

2017/0292597 A1* 10/2017 Kurek ................... F16H 49/001

FOREIGN PATENT DOCUMENTS

| | | |
|---|---|---|
| DE | 10309738 A1 | 9/2004 |
| DE | 102007049072 A1 | 4/2009 |
| DE | 102014202060 A1 | 8/2015 |
| EP | 0741256 B1 | 11/2000 |

* cited by examiner

HARMONIC DRIVE

CROSS-REFERENCE TO RELATED APPLICATIONS

This application is the U.S. National Phase of PCT Application No. PCT/DE2017/100131 filed Feb. 17, 2017 which claims priority to DE 102016204017.0 filed Mar. 11, 2016, the entire disclosures of which are incorporated by reference herein.

TECHNICAL FIELD

This disclosure relates to a harmonic drive that can be used as an actuating mechanism, which has a wave generator and a flexible, externally toothed transmission element that can be deformed by the wave generator, in particular in the form of a flex spline, wherein the flexible, externally toothed transmission component meshes with at least one internally toothed transmission component, which is typically inherently rigid.

BACKGROUND

A harmonic drive of this kind is known from EP 0 741 256 B1, for example. An elastic, externally toothed element of this harmonic drive is designed as a "top hat" and has various regions of nonuniform thickness.

In addition to differences in wall thickness, which can be provided in the case of components of transmissions, especially flexible components of harmonic drives, according to component design, there are always deviations inherent in the series production process, e.g. in wall thickness and in the overall component geometry, from the ideal geometry. In particular, deviations from roundness of essentially rotationally symmetrical parts cannot be completely excluded. Depending on the extent of such deviations, operating properties of the transmission, in particular a harmonic drive, can be affected thereby.

Another harmonic drive is known from DE 10 2014 202 060 A1, for example. This is a component of an electric camshaft adjuster. In this case, an adjusting shaft, which drives a wave generator of the harmonic drive, has a plurality of preferential positions.

It is also possible to use a harmonic drive disclosed in DE 10 2007 049 072 A1 in an electric camshaft adjuster. The harmonic drive is coupled to an adjusting motor via a compensating coupling, namely an Oldham coupling.

SUMMARY

It is the underlying object of the disclosure to specify a harmonic drive which is developed further with respect to the stated prior art, especially in respect of the running properties thereof.

According to the disclosure, this object is achieved by a harmonic drive having the features described herein. The harmonic drive has, in a basic structure known per se, a flexible, externally toothed transmission element, which is deformed continuously by a wave generator during the operation of the harmonic drive. In contrast to the prior art, this flexible, externally toothed transmission element has a shape which is non-elliptical with respect to the mechanically unloaded state thereof. This means that even a circular shape—as a special case of an ellipse—is excluded as a shape of the flexible, externally toothed transmission element when it is not subject to any external forces.

In comparison with a rigid elliptical component, in particular a bearing ring, of the wave generator used in the harmonic drive, the flexible, externally toothed transmission element thus has a more complex shape when compared in each case with a circular shape. The greater complexity finds expression particularly in the fact that a curve which indicates the deviations of the noncircular part, that is to say, in one case, the rigid inner ring and, in the other, the flexible transmission element, relative to the circular shape over the entire circumference of the respective part has more inflection points in the case of the flexible transmission element than in the case of the rigid component of the wave generator. In contrast to said curve, which exhibits deviations from the circular shape, the flexible, externally toothed transmission element itself has no inflection points. This means that the transmission element is curved in the same direction over its entire circumference.

The disclosure is based on the consideration that a flexible transmission element, which is essential for the functioning of a harmonic drive, typically has a basic shape, i.e. a shape in the mechanically unloaded state, which describes a circle in cross section. For reasons connected with manufacture, however, there can be unintentional deviations from the ideal circular shape. In particular, the flexible transmission element can have an undefined oval non-circularity in its initial state. The lack of definition of this oval non-circularity relates both to deviations in terms of magnitude from the ideal circular shape and to the angular alignment of the oval shape. During the assembly of the wave generator, a non-ideal transmission element of this kind is conventionally mounted on a wave generator component with a defined elliptical shape. The angular alignment between the semi-axes of the flexible transmission element, which is slightly noncircular owing to its manufacture, and the semi-axes of the elliptical component of the wave generator is undetermined here. Depending on the angular relation between said parts, there can be unwanted cogging torques to a greater or lesser extent during the operation of the wave generator. Owing to such cogging torques, there are preferential positions of the wave generator, which have a negative effect on the controllability of a system comprising a servo motor and the harmonic drive.

According to the disclosure, negative influences of this kind are selectively eliminated in that the flexible, externally toothed transmission element of the harmonic drive has a basic shape which not only deviates from a circular shape but also from an elliptical shape with unequal semi-axes. By virtue of the fact that the flexible, externally toothed transmission element has a more complex deviation in shape from a circular shape in the mechanically unloaded state than a noncircular, in particular elliptical, inner ring of the wave generator, cogging torques within the harmonic drive are reduced to a negligible level.

Like the complex noncircular, flexible, externally toothed transmission element, the elliptical inner ring of the wave generator has a mean radius which in each case corresponds to the radius of a circle, wherein, in the assembled state of the harmonic drive, the two circles are arranged concentrically. A number of points of intersection are formed between the imaginary circle, the radius of which corresponds to the mean radius of the inner ring of the harmonic drive, and the actual outer contour of said inner ring. Here, the terms "radius of the inner ring" and "outer contour of the inner ring" relate to the center of a race on which rolling elements, in particular balls, roll, said rolling elements deforming the flexible, externally toothed transmission element—typically via an outer ring of the rolling bearing.

Similarly, there are points of intersection between the actual, mechanically unloaded contour of the flexible transmission element and the circle, the radius of which corresponds to the mean radius of this transmission element. In a preferred embodiment, the number of points of intersection distributed over the circumference, which are defined by the contours of the inner ring of the wave generator, is smaller than the number of points of intersection distributed over the circumference which exist in the case of the flexible, externally toothed transmission element. In the case of the inner ring of the wave generator, there is preferably an even number of circumferential segments in which the actual radius is larger than the mean radius, whereas, in the case of the flexible transmission element, there is an uneven number of such circumferential segments.

In particular, the flexible, externally toothed transmission element can be designed as a lobed constant-diameter shape, when viewed in cross section. In geometry, a lobed constant-diameter shape is taken to mean a two-dimensional figure which has the same thickness in every direction. This means that two parallel lines that are moved toward the figure are always at the same distance from one another when they touch the figure, irrespective of their angular alignment relative to the figure. The basic shape of the flexible, externally toothed transmission element can be a triangle with arc-shaped sides, for example. It is likewise possible for the flexible transmission element to be a lobed constant-diameter shape with a pentagonal basic shape in cross section, for example.

Even in cross-sectional shapes which deviate from a lobed constant-diameter shape, the flexible transmission element has a plurality of arc segments in which the actual radius with respect to the undeformed state is larger than the mean radius of this component. In one possible embodiment, at least two of these arc segments, in particular all such arc segments, have a nonuniform length. Similarly, all the arc segments of the flexible transmission element which lie within the circle with the mean radius of this transmission element can have lengths that differ from one another in such an embodiment. By means of this selective asymmetry of the flexible, externally toothed transmission element, any cogging torques or resonances during the operation of the harmonic drive are suppressed in a particularly effective way.

In all cases, the flexible transmission element has a cylindrical segment on which the external toothing is situated. If the entire flexible transmission element is of cylindrical configuration, it is referred to as a flex spline. In this case, the external toothing preferably extends over the entire extent of the flex spline measured in the axial direction. In alternative embodiments, the external toothing extends only over part of the cylindrical segment of the flexible transmission element. In this case, a segment in the form of an annular disk, which can be oriented either radially inward or radially outward, adjoins that end of the cylindrical segment which is not adjoined by the external toothing. In the first case, the term "pot shape" of the flexible transmission element is used while, in the second case, the term "hat shape" of the flexible transmission element is used.

The harmonic drive can be used as an actuating mechanism in a motor vehicle, for example. In this context, it can be an actuating mechanism of an electric camshaft adjuster or an actuating mechanism of a device for adjusting the compression ratio of a reciprocating piston engine, for example.

BRIEF DESCRIPTION OF THE DRAWINGS

Illustrative embodiments of the invention are explained in greater detail below by means of a drawing, in which.

DETAILED DESCRIPTION

Figure 1:
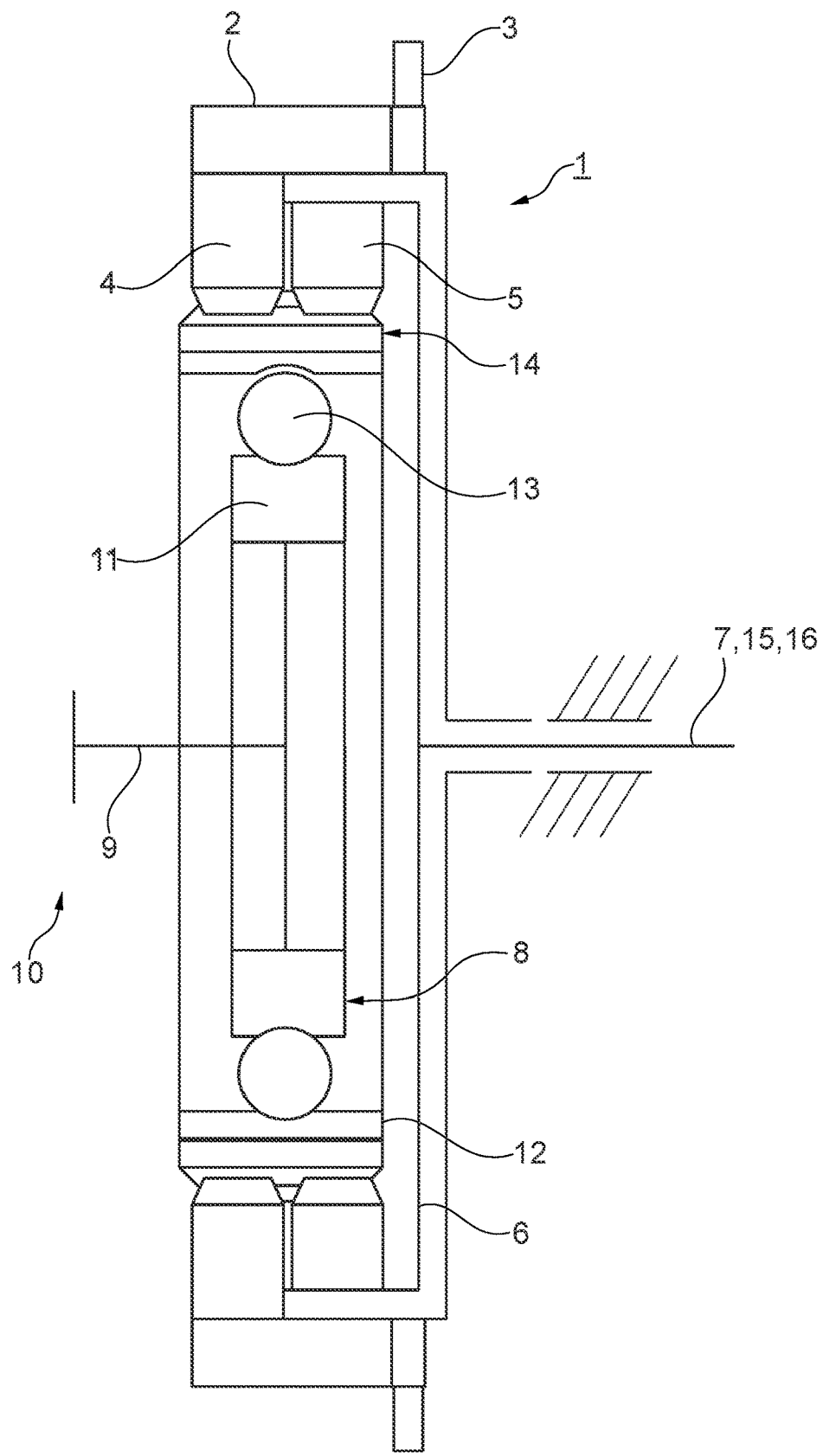
FIG. 1 shows a harmonic drive in a schematic sectional illustration.

The construction of a harmonic drive, denoted overall by the reference sign 1, for the basic functioning of which attention is drawn to the prior art cited at the outset, is illustrated in FIG. 1.

The harmonic drive 1 has a housing 2, which is firmly connected to an input wheel 3. The input wheel 3 can be driven by means of a traction means or of a gearwheel, for example. Also firmly connected to the housing 2 is an input gearwheel 4 as a transmission component, this being internally toothed. Next to the input gearwheel 4 is an output component 5 as a further transmission component, which is likewise internally toothed and is rigidly coupled to an output shaft 7 via an output disk 6. The output shaft 7 could be that of an electric camshaft phaser 15 or a device for adjusting the compression ration of a reciprocating piston engine 16.

Radially within the two internally toothed transmission components 4, 5 is a wave generator 8, which is driven by means of an adjusting shaft 9. The adjusting shaft 9 is coupled to an adjusting motor (not shown), in particular an electric motor, via a compensating coupling 10. An inner ring 11 of the wave generator 8 has a rigid elliptical shape. A flexible outer ring 12 of the wave generator 8 adapts continuously to the elliptical shape of the inner ring 11 during the rotation of the adjusting shaft 9, wherein balls 13 roll as rolling elements between the inner ring 11 and the outer ring 12.

A flexible, externally toothed transmission element 14, namely a flex spline, is placed directly around the outer ring 12. During the rotation of the adjusting shaft 9 of the wave generator 8, the flex spline 14 continuously assumes the shape of the outer ring 12. During this process, the external toothing of the flex spline 14 is brought into engagement with the internal toothing of the transmission components 4, 5 at two diametrically opposite locations. By means of slightly different numbers of teeth on said transmission components 4, 5, 14, a high transmission ratio of the harmonic drive 1, in the present case a transmission ratio of 70:1, is obtained.

Figure 2:
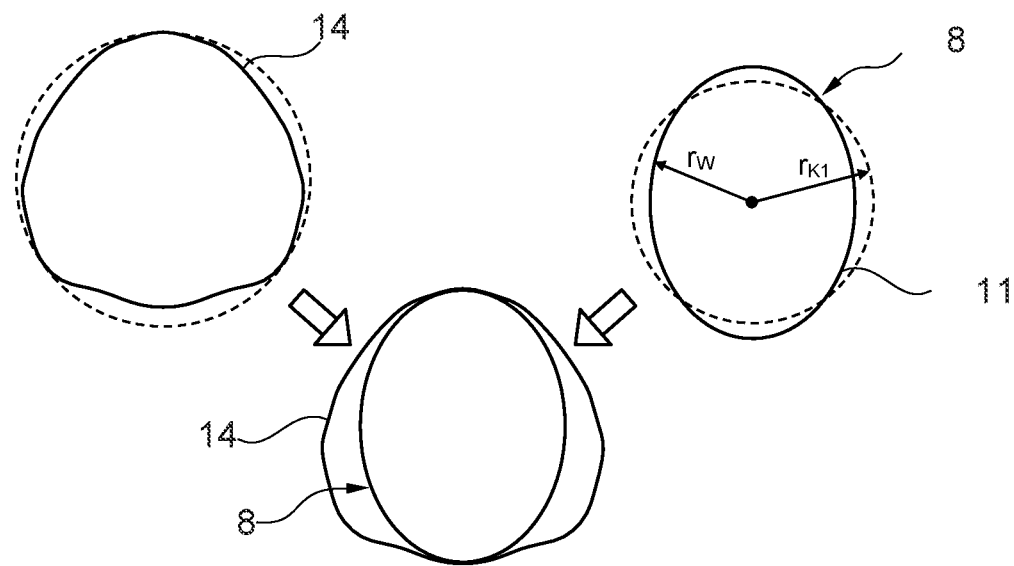
FIG. 2 shows components, namely an inner ring and a flexible transmission element, for the harmonic drive shown in FIG. 1 in an isolated state and in the assembled state.

FIG. 2 shows, in symbolic form, two components of the harmonic drive 1 shown in FIG. 1, namely the inner ring 11 of the wave generator 8 and the flex spline 14. In this case, said parts 11, 14 of the harmonic drive 1 are illustrated both in the mutually separate and in the assembled state. To clarify the geometric relationships, a deformation of the flex spline 14 by the wave generator 8, of the kind which occurs during actual operation of the harmonic drive 1, is not taken into account in the last-mentioned state in FIG. 2.

The elliptical shape of the inner ring 11 and the asymmetrical configuration of the transmission element 14, i.e. the flex spline, which is significantly more complex in comparison, are clearly visible. The cross section of the flex spline 14 approximately describes a lobed constant-diameter shape with three corners, as shown by an enveloping dashed circle drawn around the upper left flex spline 14 of FIG. 2. The configuration of the flexible, externally toothed transmission element 14, which deviates from the circular shape with a higher degree of complexity than the inner ring 11, ensures that there is virtually no preferential position of the wave generator 8. This also applies given unavoidable fluctuations in component properties under conditions of series production.

Figure 3:
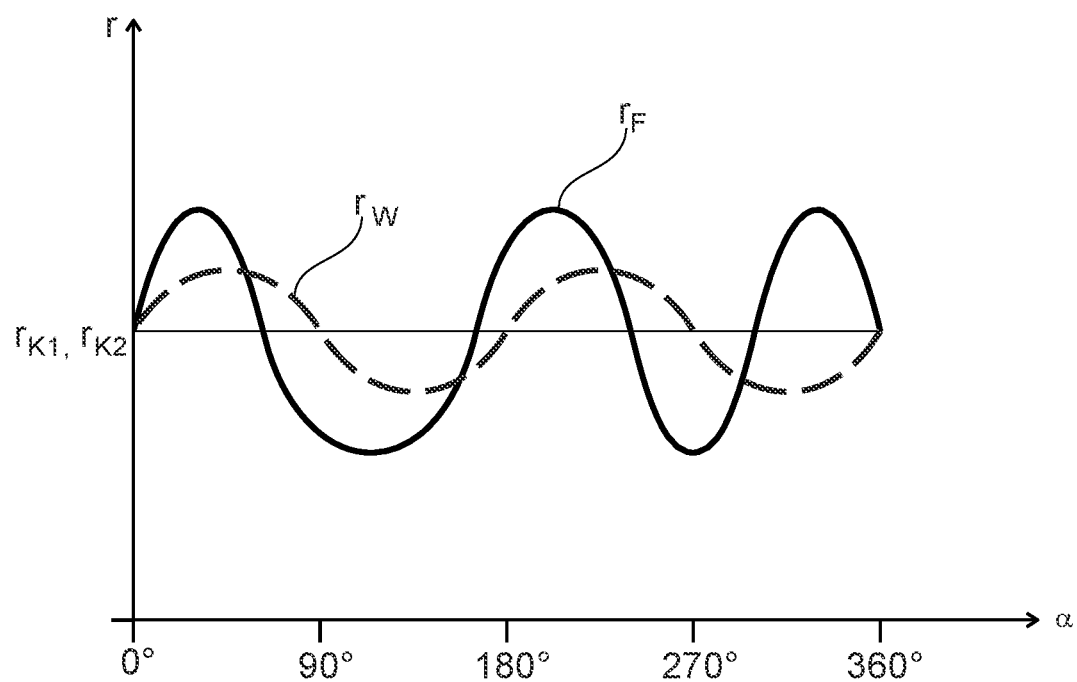
FIG. 3 shows deviations in shape of components of a harmonic drive in relation to the circular shape in a diagram.

Using another example, FIG. 3 illustrates properties of components which are likewise suitable for use in the harmonic drive shown in FIG. 1. In this case, deviations both of the rotatable, inherently rigid inner ring 11 of the wave generator 8 and of the flexible, externally toothed transmission element 14 from the circular shape are illustrated in a diagram. In this case, the full circumference of the two parts 11, 14, i.e. an angle α of 0 to 360°, is considered. The radii r of the two parts 11, 14 are shown in an idealized way, wherein the mean radius thereof is normalized to a value $r_K$. In contrast to the design shown in FIG. 2, the flex spline 14 is not a lobed constant-diameter shape in the case of FIG. 3.

The elliptical inner ring 11 has an outer contour which describes an oscillation in the diagram according to FIG. 3, wherein an actual radius defined by a distance from a center of the elliptical inner ring 11 to an outer extent of the elliptical inner ring 11 is denoted by $r_W$. The value of $r_W$ varies relative to the mean radius $r_{K1}$ at 0°, 90°, 180° and 270°. There are thus two circumferential segments in which the actual radius $r_W$ of the inner ring 11 is larger than the mean radius $r_{1K}$, and two circumferential segments in which the actual radius $r_W$ of the inner ring 11 is smaller than the mean radius $r_{K1}$. To better illustrate the mean radius $r_{K1}$ and actual radius $r_W$, the elliptical inner ring 11 of FIG. 2 is shown together with a dashed circle defining a mean circle with a mean radius $r_{K1}$, and an actual radius $r_W$ that extends from a center of the elliptical inner ring 11 to the other extent of the elliptical inner ring 11. The mean circle radius $r_{K1}$ represents an average of the actual radii $r_W$ spanning the entire circumference of the elliptical inner ring 11 from zero to 360 degrees.

The flex spline plotted in FIG. 3 is also geometrically represented in terms of a mean circle with a mean radius $r_{K2}$ and an actual radius $r_F$. For clarity of the plots and corresponding geometric relationships shown in FIG. 3, the means radius $r_{K2}$ for the represented flex spline of FIG. 3 is the same value as the mean radius $r_{K1}$ of the elliptical inner ring 11 described earlier. Similar to the construction of the earlier described actual radius $r_W$ of the elliptical inner ring 11, the actual radius $r_F$ of the flex spline extends from a center of the flex spline to an outer extent of the flex spline; furthermore, the mean radius $r_{K2}$ of the flex spline of the FIG. 3 represents an average of the actual radii $r_F$ spanning the entire circumference of the flex spline from zero to 360 degrees. Unlike the elliptical inner ring 11, the flex spline 14 shown in FIG. 3 has three circumferential segments in which the actual radius $r_F$ of the flex spline 14, with respect to the mechanically unloaded state, is larger than the mean radius $r_{K2}$. A bend in the flex spline 14 at the angle α=0°=360° is shown as being exaggeratedly sharp in FIG. 3. It is clear from FIG. 3 that individual circumferential segments of the flex spline 14 in which the radius $r_F$ thereof rises above or falls below the mean radius $r_K$ are of nonuniform length. This avoidance of symmetry in the flexible transmission element 14, i.e. the flex spline, contributes significantly to operation of the harmonic drive 1 without cogging and resonance.

LIST OF REFERENCE CHARACTERS 1 harmonic drive
2 drive element, housing
3 input wheel
4 input gearwheel, transmission component
5 output gearwheel, transmission component
6 output disk
7 output shaft
8 wave generator
9 adjusting shaft
10 compensating coupling
11 inner ring
12 outer ring
13 rolling element
14 flexible, externally toothed transmission element, flex spline
15 electric camshaft phaser
16 device for adjusted compression ratio of a reciprocating piston engine
α angle
r radius
$r_F$ radius of the flex spline
$r_{K1}$ mean radius of the inner ring
$r_{K2}$ mean radius of flex spline
$r_W$ radius of the inner ring of the wave ring

The invention claimed is:
1. A harmonic drive, comprising:
  a wave generator having:
    an elliptical inner ring;
    a flexible outer ring; and,
    a plurality of rolling elements arranged between the elliptical inner ring and the flexible outer ring, the plurality of rolling elements configured to continuously deform the flexible outer ring via rotation of the elliptical inner ring;
  a flexible, externally toothed transmission element circumferentially surrounding the flexible outer ring and configured to be deformed by the plurality of rolling elements via the flexible outer ring, the externally toothed transmission element having a non-elliptical shape with respect to its mechanically unloaded state when viewed along its rotational axis; and,
  at least one internally toothed transmission component configured to mesh with the externally toothed transmission element.
2. The harmonic drive of claim 1, wherein the externally toothed transmission element is a flex spline.
3. The harmonic drive of claim 1, wherein the harmonic drive is used as an actuating mechanism of an electric camshaft phaser.
4. The harmonic drive of claim 1, wherein the harmonic drive is used as an actuating mechanism for varying a compression ratio of a reciprocating piston engine.
5. The harmonic drive of claim 1, wherein the externally toothed transmission element includes a plurality of lobes in its mechanically unloaded state, the plurality of lobes defining an enveloping circle such that each of the plurality of lobes is arranged within and tangent to the enveloping circle.
6. The harmonic drive of claim 1, wherein one of the at least one internally toothed transmission component is rigidly coupled to an output shaft.
7. The harmonic drive of claim 1, wherein deformation of the externally toothed transmission element via rotation of the elliptical inner ring causes the externally toothed transmission to rotate relative to the externally toothed transmission element.
8. A harmonic drive, comprising:
  a wave generator having:
    an elliptical inner ring;
    a flexible outer ring; and, a plurality of rolling elements arranged between the elliptical inner ring and the flexible outer ring, the plurality of rolling elements configured to continuously deform the flexible outer ring via rotation of the elliptical inner ring;

a flexible, externally toothed transmission element circumferentially surrounding the flexible outer ring and configured to be deformed by the plurality of rolling elements via the flexible outer ring; and, a graphical representation of a shape of the elliptical inner ring and a shape of the externally toothed transmission element including:

a first plot defining a first mean radius of the externally toothed transmission element in an unloaded state as a function of a circumference of the externally toothed transmission element;

a second plot defining a first actual radius of the externally toothed transmission element in an unloaded state as a function of the circumference of the externally toothed transmission element;

a third plot defining a second mean radius of the elliptical inner ring in an unloaded state as a function of a circumference of the elliptical inner ring;

a fourth plot defining a second actual radius of the elliptical inner ring in an unloaded state as a function of the circumference of the elliptical inner ring; and, a first number of intersection points between the first plot and the second plot is greater than a second number of intersection points between the third plot and the fourth plot.

9. The harmonic drive of claim 8, wherein a first number of circumferential segments in which the first actual radius is larger than the first mean radius is uneven and a second number of circumferential segments in which the second actual radius is larger than the second mean radius is even.

10. The harmonic drive of claim 9, wherein the first number of circumferential segments comprises at least two circumferential segments that have a non-uniform length.

11. The harmonic drive of claim 8, further comprising at least one internally toothed transmission component configured to mesh with the externally toothed transmission element, wherein deformation of the externally toothed transmission element via rotation of the elliptical inner ring causes the externally toothed transmission element to rotate relative to the externally toothed transmission element.

* * * * *